United States Patent
Kato

(10) Patent No.: US 8,334,997 B2
(45) Date of Patent: Dec. 18, 2012

(54) IMAGE FORMING APPARATUS, PROGRAM AND IMAGE FORMING SYSTEM

(75) Inventor: Masashi Kato, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1233 days.

(21) Appl. No.: 12/015,181

(22) Filed: Jan. 16, 2008

(65) Prior Publication Data

US 2008/0181448 A1 Jul. 31, 2008

(30) Foreign Application Priority Data

Jan. 31, 2007 (JP) ................. 2007-021774

(51) Int. Cl.
*G06F 15/00* (2006.01)
*G03G 15/16* (2006.01)

(52) U.S. Cl. .......................... 358/1.15; 399/66

(58) Field of Classification Search .................. 358/1.13, 358/1.15
See application file for complete search history.

(56) References Cited

U.S. PATENT DOCUMENTS

| | | | |
|---|---|---|---|
| 6,867,873 B1 * | 3/2005 | Han | 358/1.12 |
| 6,975,414 B2 | 12/2005 | Nagatomi et al. | |
| 2006/0203256 A1 * | 9/2006 | Hagiwara | 358/1.1 |

FOREIGN PATENT DOCUMENTS

| | | |
|---|---|---|
| JP | 9-080907 A | 3/1997 |
| JP | 2002-072603 A | 3/2002 |
| JP | 2004-287686 | 10/2004 |
| JP | 2005-119010 | 5/2005 |

OTHER PUBLICATIONS

JP Office Action dtd Nov. 11, 2008, JP Appln. 2007-021774 (partial translation).

* cited by examiner

*Primary Examiner* — Saeid Ebrahimi Dehkordy
(74) *Attorney, Agent, or Firm* — Banner & Witcoff, Ltd.

(57) ABSTRACT

An image forming apparatus comprising: a determining unit which determines a start time for forming an image on a recording medium; a judging unit having a first judging unit which judges whether to execute a quality improving process based on the start time; and a control unit which controls an execution of the quality improving process based on a judgment result of the first judging unit.

14 Claims, 2 Drawing Sheets

IMAGE FORMING APPARATUS, PROGRAM AND IMAGE FORMING SYSTEM

CROSS REFERENCE TO RELATED APPLICATION

The present application claims priority from Japanese Patent Application No. 2007-021774, which was filed on Jan. 31, 2007, the disclosure of which is herein incorporated by reference in its entirety.

TECHNICAL FIELD

The present invention relates to an image forming apparatus, a program, and an image forming system.

BACKGROUND

For example, Patent Document 1 disclosed a laser printer as follows. If the time at which a quality improving process, such as a density correcting process, is performed is predetermined, the laser printer executes a density correction at the predetermined time regardless of whether a user uses the laser printer for printing operation.

However, the above described laser printer executes a density correction at the predetermined time regardless of whether the user uses the laser printer for printing operation, and hence, there is a problem in the fact that the user cannot use an image forming apparatus such as a laser printer or inkjet printer during execution of such a density correction.

To solve this problem, Patent Document 2 disclosed an image forming apparatus as follows. If the time at which image formation is started is predetermined, a quality improving process, such as a warm-up process, is started before the predetermined start time (hereinafter, referred to simply as the "set time").

[Patent Document 1] Japanese Published Unexamined Patent Application No. 2005-119010

[Patent Document 2] Japanese Published Unexamined Patent Application No. 2004-287686

SUMMARY

However, the image forming apparatus disclosed by Patent Document 2 has disadvantages as follows. The image forming apparatus disclosed in the Patent Document 2 only executes the quality improving process before the set time. Therefore, the realization of a suitable operation is based on the fact that it is necessary to secure a sufficient time for the quality improving process before the set time to realize a suitable operation.

As a result, for example, if time required to finish the quality improving process is longer than time taken until the set time, the image forming apparatus cannot finish the quality improving process completely before the set time, and hence a user cannot use the image forming apparatus until the quality improving process is completed, thus imposing a great burden on the user.

In other words, the image forming apparatus disclosed in Patent Document 2 can solve the above-described problem, if the image forming apparatus starts the quality improving process from the time sufficiently earlier than the set time. However, if the image forming apparatus cannot start the quality improving process from the time sufficiently earlier than the set time, the image forming apparatus cannot solve the problem, and a great burden will be imposed on the user.

The present invention has been made in consideration of these circumstances. It is therefore an object of the present invention to reduce a load imposed on a user even if a quality improving process cannot be started from the time sufficiently earlier than the set time.

To achieve the object, according to a first aspect, the present invention includes a determining unit for determining a timing at which image formation is started; a judging unit having a first judging unit for judging whether to execute a quality improving process based on a starting timing determined by the determining unit; and a control unit for controlling the execution of the quality improving process based on a judgment result of the first judging unit.

Therefore, in the invention according to the first aspect, it is judged whether to execute a quality improving process based on a starting timing determined by the determining unit, and hence it becomes possible to reduce the burden of disenabling a user to use an image forming system until the quality improving process is completed.

BRIEF DESCRIPTION OF THE DRAWINGS

Illustrative aspects of the present invention will be described in detail with reference to the following figures wherein.

DETAILED DESCRIPTION OF THE PREFERRED EMBODIMENTS

An exemplary embodiment of the present invention will be hereinafter described with reference to the attached drawings.

1. Outline of Image Forming System

Figure 1:
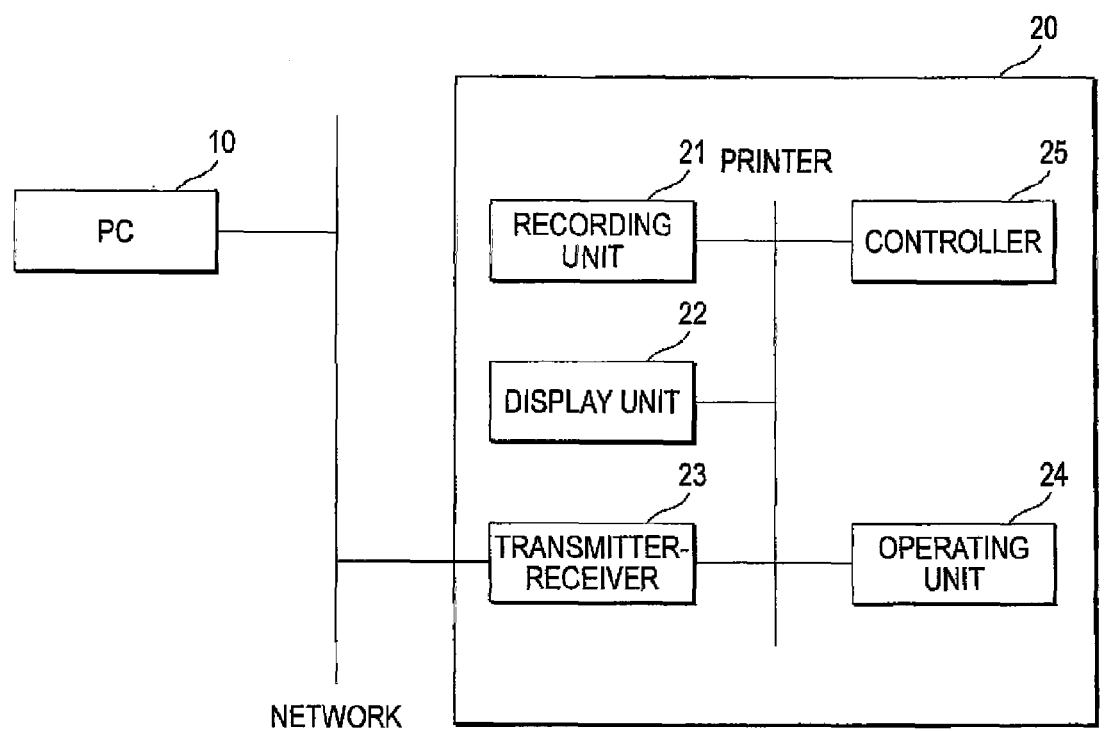
FIG. 1 is a schematic diagram showing the outline of an image forming system including an image forming apparatus (printer) according to an exemplary embodiment of the present invention.

FIG. 1 is a schematic diagram showing the outline of an image forming system that includes an image forming apparatus (printer) according to an exemplary embodiment of the present invention. A computer 10 is a terminal machine which comprises a CPU, a ROM, and a RAM, etc. The computer 10 may be a portable terminal, such as a cellular phone, as well as a so-called computer.

The printer 20 is an electro photographic type image forming apparatus that forms an image on a recording medium, such as a recording sheet of paper or an OHP sheet. The printer 20 according to the exemplary embodiment is connected to the computer 10 via a network, such as Ethernet (registered trademark).

The printer 20 comprises a recording unit 21, a display unit 22, a transmitter-receiver 23, an operating unit 24, and a controller 25, etc. The recording unit 21 is an image forming unit that forms an image on a recording medium. The recording unit 21 according to the exemplary embodiment is a color electro-photographic type image forming unit.

In more detail, the recording unit 21 is a so-called direct tandem type image forming unit that forms an image such that electrostatic latent images formed on a plurality of photoconductors, respectively, are developed with developers provided with corresponding colors, are then transferred onto a recording medium conveyed by a conveying belt so that images of the developers of the colors are superimposed on each other, and are fixed by a heat fixing device. Since the recording unit 21 has a well-known structure, a detailed description of this is omitted here.

The display unit 22 is an information unit that gives various pieces of information to a user. The transmitter-receiver 23 is an interface that transmits and receives data to and from the computer 10. The operating unit 24 is an input unit that accepts an input or operation executed by a user.

2. Operation of Image Forming System

Figure 2:
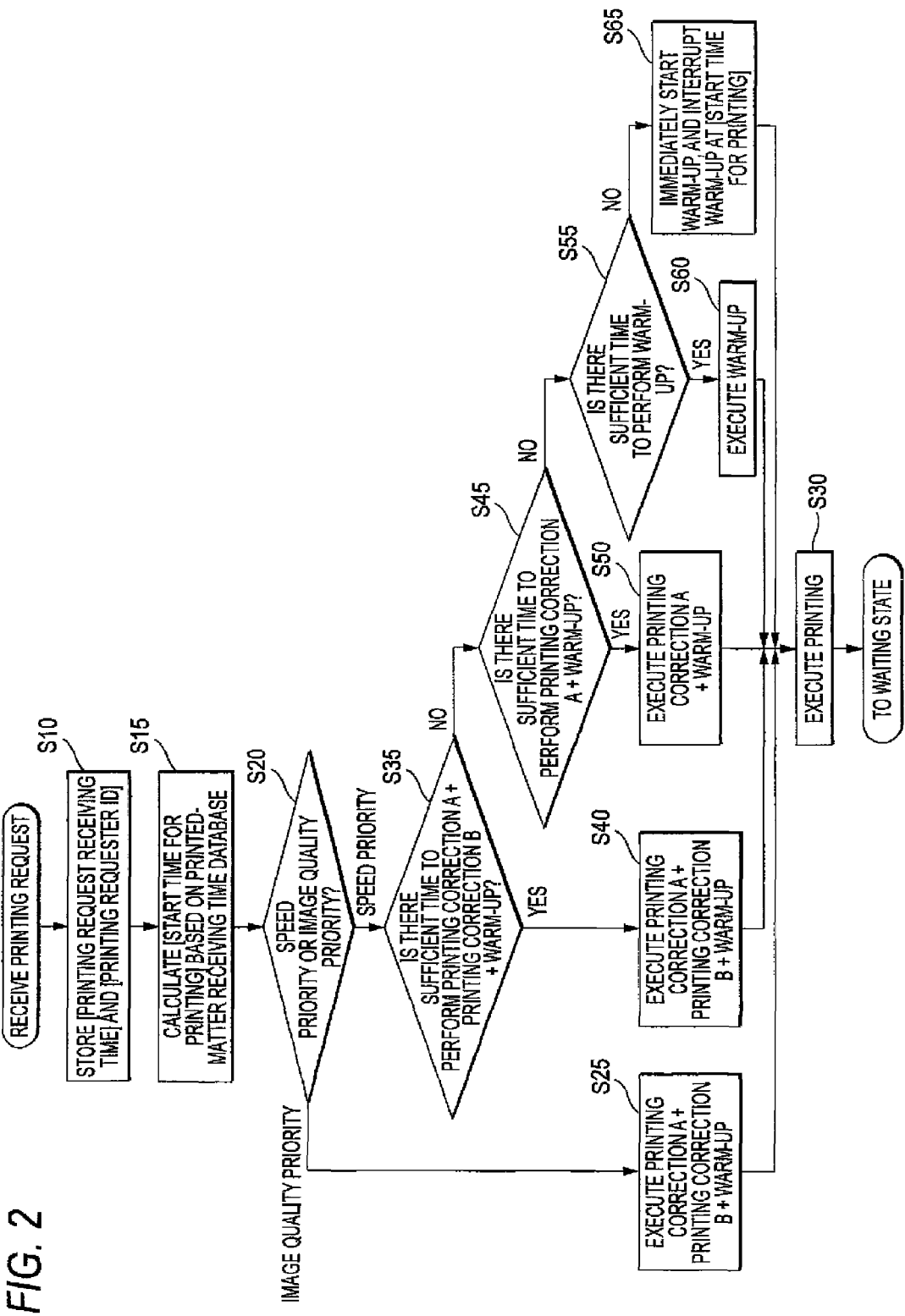
FIG. 2 is a chart showing a control flow executed by the printer.

FIG. 2 is a chart that shows a control flow that is executed by the printer 20 when the printer 20 receives a command which is given from the computer 10 to the printer 20 in order to perform printing.

When the control flow of FIG. 2 is started, the printer 20 acquires requester identification information (requester ID), and the printer 20 stores the requester identification information in a storage device, such as RAM, disposed in the printer 20 (S10). Requester identification information is information to identify the time at which the printing request has been received and to identify the computer 10 that has given the printing request or a user who has made the printing request. Thereafter, based on a printed-matter receiving time database and the requester ID, the time at which the printer 20 starts the printing is calculated (S15).

In the present embodiment, the printer 20 acquires the requester ID based on identification information, such as a computer name stored in the computer 10 or IP address allocated to the computer 10, or based on identification information, such as a user name used when a user logs in (logs on) the image forming system so that the user can use the computer 10.

The "printed-matter receiving time database" is a delay time table that stores the relationship between a delay time and requester ID. The delay time is a time required to actually start printing from the time at which a printing request has been received. In the exemplary embodiment, the printed-matter receiving time database is constructed by allowing a user or an administrator to pre-set or pre-input the delay time for each requester ID, and is stored in a storage device disposed in the printer 20.

In other words, in the exemplary embodiment, the printer 20 automatically sets the delay time required to start printing for each user based on the printed-matter receiving time database. Therefore, for example, if the distance between a user and the printer 20 is long and if the user spends much time to receive printed matter, a troubled case, such as a case in which a third party takes away the printed matter, can be reduced by lengthening the delay time required to start printing. The printer 20 may calculate the delay time required to start printing based on the printing starting time designated by the user according to another well-known method.

Thereafter, based on contents set by the user via the operating unit 24 or the computer 10 (printer driver), it is determined whether the printer 20 executes a speed priority mode or an image quality priority mode (S20).

The term "speed priority mode" denotes a printing mode in which priority is given to the fact that the printer 20 starts printing at the printing starting time (hereinafter, referred to simply as "starting time") calculated at step S15. The term "image quality priority mode" denotes a printing mode in which the image quality of printed matter takes priority over the starting time.

If it is determined that the image quality priority mode is executed (S20: image quality priority), the printer 20 executes a quality improving process, such as a color shift correcting process (which is mentioned as "printing correction A" in FIG. 2), a belt cleaning process (which is mentioned as "printing correction B" in FIG. 2), or a warm-up process (S25). After these quality improving processes are completed, the printer 20 executes printing (S30).

The "color shift correcting process" is a well-known process in which a patch for correcting a positional deviation is formed on a conveying belt so as to correct a deviation in position where developer color images are superimposed on each other, and, based on the resulting measurement result, the image formation position is adjusted to improve image quality. The "belt cleaning process" (hereinafter, referred to simply as cleaning process) is a well-known process in which developer or dust adhering to, for example, the conveying belt is removed, and a recording medium or a developer image is prevented from being stained or deformed, thus improving image quality. The "warm-up process" is a well-known process in which the temperature of the heat fixing device is increased up to the temperature at which a developer image can be sufficiently fixed, thus improving image quality.

If the speed priority mode is selected at step S20 (S20: speed priority), it is determined whether the printer can finish the color shift correcting process, the cleaning process, and the warm-up process (S35). If it is determined that the printer 20 can finish the color shift correcting process, the cleaning process, and the warm-up process (S35: YES), the printer 20 executes these quality improving processes (S40). After all quality improving processes are completed, the printer 20 executes printing (S30).

On the other hand, if it is determined that the printer 20 cannot finish the color shift correcting process, the cleaning process, and the warm-up process (S35: NO), it is determined whether the printer 20 can finish the color shift correcting process and the warm-up process (S45). If it is determined that the printer 20 can finish the color shift correcting process and the warm-up process (S45: YES), the printer 20 executes these quality improving processes (S50). After these quality improving processes are completed, the printer 20 executes printing (S30).

If it is determined that the printer 20 cannot finish the color shift correcting process and the warm-up process (S45: NO), it is determined whether the printer 20 can finish the warm-up process (S55). If it is determined that the printer 20 can finish the warm-up process (S55: YES), the printer 20 executes the warm-up process (S60). After the warm-up process is completed, the printer 20 executes printing (S30).

On the other hand, if it is determined that the printer 20 cannot finish the warm-up process (S55: NO), the printer 20 executes the warm-up process until the printing starting time is reached. When the printing starting time is over, the printer 20 stop executing the warm-up process, and the printer 20 starts printing without waiting for the completion of the warm-up process (S30).

3. Feature of the Image Forming System (Printer) According to the Present Embodiment As is well known, the color electro-photographic type image forming unit forms a color image such that developer images of yellow, magenta, cyan, black, etc., that are formed on a photosensitive drum are super imposed on each other on a recording medium or on a transfer belt. Therefore, if superimposed positions of developer images having such colors do not coincide with each other when these developer images are superimposed on each other, the image quality of printed matter will be deteriorated.

Additionally, if a developer or the like adheres to and soils a transfer belt or a conveying belt which conveys a recording medium, the image quality of printed matter will be deteriorated, because an unnecessary developer or dust adheres to the recording medium.

Additionally, in the electro-photographic type image forming unit, a developer image transferred to a recording medium is thermally fixed by a heat fixing device. Therefore, if the temperature of the fixing device is low so that a developer (toner) cannot be sufficiently heated, a developer image cannot be sufficiently fixed to the recording medium, and the quality of printed matter will be deteriorated.

In contrast, in the exemplary embodiment, it is judged whether to execute a quality improving process, based on the printing starting timing (starting time) determined at step S15. Therefore, for example, it is possible to reduce the burden of disenabling a user to use the image forming system (printer 20) until the quality improving process is completed.

Additionally, in the exemplary embodiment, if the quality improving process comprises a plurality of steps including a color shift correcting process step, a cleaning process step, and a warm-up process step, the printer 20 judges which one of the process steps is to be executed, based on the starting time. Therefore, priority is given to a starting timing to form an image, and image quality can be improved.

Additionally, in the exemplary embodiment, a user can select either a case in which a starting timing to form an image takes priority or a case in which image quality takes priority. Therefore, the user-friendliness of the image forming system (printer 20) can be further improved.

Other Exemplary Embodiments

In the above-mentioned embodiment, the printer 20 executes the control flow of FIG. 2. However, the present invention is not limited to this. For example, the computer 10 may execute the control flow of FIG. 2.

More specifically, in the other exemplary embodiment, the image forming system comprises a computer 10 which executes the control flow of FIG. 2 when the computer 10 gives a printing command to the printer 20. And the computer 10 gives the notice of the result (i.e., quality improving process to be executed) to the printer 20, so that the printer 20 executes an operation according to the contents thereof.

Additionally, the quality improving process is not limited to the process shown in the above-mentioned embodiment. The quality improving process may be a density correction in which image quality is improved by correcting the density of a developer image. Additionally, members (for example, a photosensitive drum) other than the conveying belt may be cleaned through the cleaning process.

Additionally, in the above-exemplary embodiment, the image forming apparatus is the color electro-photographic type. However, the present invention is not limited to this. The present invention can be applied to a monochromatic electro-photographic type image forming apparatus or an ink-jet type image forming apparatus.

In the ink-jet type image forming apparatus, for example, a so-called purge process is a quality improving process. In the purge process, image quality is improved by clearing the clogging of a nozzle.

Additionally, in the above-exemplary embodiment, the starting time is determined based on the printed-matter receiving time database. However, the present invention is not limited to this.

Additionally, what is required of the present invention is to agree with the essentials of the invention recited in the appended claims, and hence the present invention is not limited to the embodiments described above.

Also, according to one of the aspects of the exemplary embodiments, the quality improving process comprises a plurality of process steps; the judging unit has a second judging unit for judging which one of the process steps of the quality improving process is to be executed, based on a starting timing determined by the determining unit; and the control unit controls the execution of the quality improving process, based on a judgment result of the second judging unit.

Therefore, according to the one of the aspects of the exemplary embodiments, any one of the processes constituting the quality improving process is executed, and hence priority is given to a starting timing to form an image, and image quality can be improved.

According to one of the aspects of the exemplary embodiments, the quality improving process is a process including a density correcting process, a color shift correcting process, and a cleaning process. According to one of the aspects of the exemplary embodiments, the image forming apparatus further includes a third judging unit for judging whether to operate the judging unit.

Therefore, according to the above embodiments, a user can select either a case in which a starting timing to form an image takes priority or a case in which image quality takes priority, and hence the user-friendliness of the image forming apparatus can be further improved.

According to one of the aspects of the exemplary embodiments, the embodiments comprises a computer; an image forming apparatus connected to the computer; wherein the computer comprises a determining unit which determines a starting timing for forming an image on a recording medium; a judging unit having a first judging unit which judges whether to execute a quality improving process based on the starting timing; and a control unit which controls an execution of the quality improving process based on a judgment result of the judging unit.

Therefore, according to the above embodiment, it is judged whether to execute a quality improving process based on a starting timing determined by the determining unit, and hence it becomes possible to reduce the burden of disenabling a user to use an image forming apparatus until the quality improving process is completed.

What is claimed is:

1. An image forming apparatus comprising:
   a determining unit configured to determine a time period from a time when receiving a print request to a time when actually starting image forming;
   a judging unit having a first judging unit configured to judge whether to execute a quality improving process based on the time period; and
   a control unit configured to:
      execute the quality improving process and the image forming after the quality improving process if the first judging unit judges to execute the quality improving process; and
      execute the image forming without executing the quality improving process if the first judging unit judges not to execute the quality improving process.

2. The image forming apparatus according to claim 1, wherein the quality improving process includes a plurality of processes;
   the judging unit further comprises a second judging unit configured to judge which one of the processes of the quality improving process is to be executed, based on the time period;
   and the control unit executes one of the plurality of processes of the quality improving process which the second judging unit judges to execute.

3. The image forming apparatus according to claim 2, wherein the determining unit determines the time period based on a database which stores a delay time corresponding to a time it takes a user to retrieve the recording medium.

4. The image forming apparatus according to claim 2, wherein the second judging unit judges which one of the processes is capable of being carried out within the time period.

5. The image forming apparatus according to claim 1, wherein the quality improving process is a process including at least one of a density correcting process and a color shift correcting process.

6. The image forming apparatus according to claim 1, wherein the quality improving process is a process including at least a cleaning process.

7. The image forming apparatus according to claim 1, further comprising a selecting unit which selects whether to operate the judging unit.

8. The image forming apparatus according to claim 1, wherein the determining unit determines the time period based on a delay time, and
wherein the delay time is set for each of a plurality of users.

9. The image forming apparatus according to claim 1, wherein the determining unit determines the time period based on a start time of starting the image forming and determines the start time based on identification information of a user.

10. The image forming apparatus according to claim 1, wherein the determining unit determines the time period based on a start time of starting the image forming, the start time being designated by a user.

11. An image forming system comprising:
a computer;
an image forming apparatus connected to the computer;
wherein the computer comprises a determining unit configured to determine a time period from a time when receiving a print request to a time when actually starting image forming;
a judging unit having a first judging unit which judges whether to execute a quality improving process based on the time period; and
a control unit configured to:
  execute the quality improving process and the image forming after the quality improving process if the first judging unit judges to execute the quality improving process; and
  execute the image forming without executing the quality improving process if the first judging unit judges not to execute the quality improving process.

12. The image forming system according to claim 11, wherein the quality improving process includes a plurality of processes;
the judging unit further comprises a second judging unit configured to judge which one of the processes of the quality improving process is to be executed, based on the time period; and
the control unit executes one of the plurality of processes of the quality improving process which the second judging unit judges to execute.

13. A non-transitory computer-readable medium having a computer program stored thereon and readable by a computer, said computer program, when executed by the computer, causes the computer to perform operations comprising:
determining a time period from a time when receiving a print request to a time when actually starting image forming;
judging whether to execute a quality improving process based on the time period;
executing the quality improving process and the image forming after the quality improving process if it is judged to execute the quality improving process; and
executing the image forming without executing the quality improving process if it is judged not to execute the quality improving process.

14. The computer-readable medium according to claim 13, wherein the quality improving process includes a plurality of processes; and
wherein the computer program, when executed by the computer, further causes the computer to perform an additional operation comprising judging which one of the processes of the quality improving process is to be executed, based on the time period.

* * * * *